United States Patent
Yang et al.

(10) Patent No.: US 10,520,619 B2
(45) Date of Patent: Dec. 31, 2019

(54) FWI MODEL DOMAIN ANGLE STACKS WITH AMPLITUDE PRESERVATION

(71) Applicants: Di Yang, Spring, TX (US); Reeshidev Bansal, Spring, TX (US); Spyridon K. Lazaratos, Houston, TX (US); Jia Yan, Houston, TX (US); Anatoly I. Baumstein, Houston, TX (US)

(72) Inventors: Di Yang, Spring, TX (US); Reeshidev Bansal, Spring, TX (US); Spyridon K. Lazaratos, Houston, TX (US); Jia Yan, Houston, TX (US); Anatoly I. Baumstein, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 606 days.

(21) Appl. No.: 15/251,298

(22) Filed: Aug. 30, 2016

(65) Prior Publication Data

US 2017/0108602 A1    Apr. 20, 2017

Related U.S. Application Data

(60) Provisional application No. 62/241,780, filed on Oct. 15, 2015.

(51) Int. Cl.
*G01V 1/28* (2006.01)
*G01V 1/32* (2006.01)
(Continued)

(52) U.S. Cl.
CPC .......... *G01V 1/282* (2013.01); *E21B 41/0092* (2013.01); *G01V 1/325* (2013.01);
(Continued)

(58) Field of Classification Search
CPC .... E21B 41/0092; G01V 1/282; G01V 1/325; G01V 1/362; G01V 2210/57; G01V 2210/632
See application file for complete search history.

(56) References Cited

U.S. PATENT DOCUMENTS

| | | |
|---|---|---|
| 3,812,457 A | 5/1974 | Weller |
| 3,864,667 A | 2/1975 | Bahjat |

(Continued)

FOREIGN PATENT DOCUMENTS

| | | |
|---|---|---|
| CA | 2 796 631 | 11/2011 |
| EP | 1 094 338 | 4/2001 |

(Continued)

OTHER PUBLICATIONS

Frazer Barclay, Et Al, "Seismic Inversion: Reading Between the Lines", pp. 42-63, Oilfield Review (Year: 2008).*

(Continued)

*Primary Examiner* — Michael J Dalbo
(74) *Attorney, Agent, or Firm* — ExxonMobil Upstream Research Company—Law Department

(57) ABSTRACT

A method, including: obtaining a seismic dataset that is separated into subsets according to predetermined subsurface reflection angle ranges; performing, with a computer, an acoustic full wavefield inversion process on each of the subsets, respectively, to invert for density and generate respective density models; generating acoustic impedances for each of the subsets, as a function of reflection angle, using the respective density models; and transforming, using a computer, the acoustic impedances for each of the subsets into reflectivity sections, wherein the transforming includes normalizing the reflectivity sections by their respective bandwidth.

11 Claims, 4 Drawing Sheets

(51) Int. Cl.
  *G01V 1/36* (2006.01)
  *E21B 41/00* (2006.01)
(52) U.S. Cl.
  CPC .......... *G01V 1/362* (2013.01); *G01V 2210/57* (2013.01); *G01V 2210/632* (2013.01)

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,525,873 B1 * | 4/2009 | Bush .................. G01V 1/28 367/37 |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 14,329,431 | 7/2014 | Krohn et al. |
| 14,330,767 | 7/2014 | Tang et al. |
| 8,892,413 B2 * | 11/2014 | Routh .................. G01V 1/28 703/10 |
| 2002/0049540 A1 | 4/2002 | Beve et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0104158 A1 * | 5/2006 | Walls .................. G01V 1/30 367/73 |
| 2006/0235666 A1 | 10/2006 | Assa et al. |
| 2007/0036030 A1 | 2/2007 | Baumel et al. |
| 2007/0038691 A1 | 2/2007 | Candes et al. |

(56) References Cited

U.S. PATENT DOCUMENTS

| | | |
|---|---|---|
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1 | 3/2011 | Xia et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0051177 A1* | 3/2012 | Hardage ............... G01V 1/286 367/43 |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0028052 A1* | 1/2013 | Routh ............... G01V 1/28 367/43 |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1* | 11/2013 | Plessix ............... G01V 1/30 703/2 |
| 2014/0350861 A1 | 11/2014 | Wang et al. |
| 2014/0358504 A1 | 12/2014 | Baumstein et al. |
| 2014/0372043 A1 | 12/2014 | Hu et al. |
| 2016/0341858 A1* | 11/2016 | Magnusson ......... G02B 5/3008 |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |
| WO | WO-2015145257 A2 * | 10/2015 ............. G01V 1/306 |

OTHER PUBLICATIONS

Aki, K and Richards, P (1980) Quantitative seismology, 2nd edition, University Science Books, pp. 133-155.

Dickens, T. A. et al. (2011) "RTM angle gathers using Poynting vectors", *SEG Technical Program Expanded Abstracts* 2011: pp. 3109-3113.

Sheriff, R.E. et al. (2002) *Encyclopedic Dictionary of Applied Geophysics*, 4th edition., SEG, pp. i-xii, 1-29.

Sheriff, R.E. et al. (2002) *Encyclopedic Dictionary of Applied Geophysics*, 4th edition., SEG, pp. i-xii, 400-402.

Xu, S., et al. (2011), "3D angle gathers from reverse time migration", *Geophysics*, vol. 76, No. 2, S77-S92. doi:10.1190/1.3536527.

Zhang, Y. et al. (2013) "A stable and practical implementation of least-squares reverse time migration". SEG Technical Program Expanded Abstracts 2013: pp. 3716-3720.

Mora, P. (1988) "Elastic wave-field inversion of reflection and transmission data" *Geophysics*, vol. 53, No. 6, pp. 750-759.

Morgan, J. et al. (2013) "Next-generation seismic experiments: wide-angle, multi-azimuth, three-dimensional, full-waveform inversion", *Geophysical Journal International*, Issue 195, pp. 1657-1678.

Shen, F. et al. (2002) "Effects of fractures on NMO velocities and P-wave azimuthal AVO response", *Geophysics*, vol. 67, No. 3, pp. 711-726.

Tang, B. et al. (2013) "3D angle gathers with plane-wave reverse-time migration", *Geophysics*, vol. 78, No. 2, pp. S117-S123.

\* cited by examiner

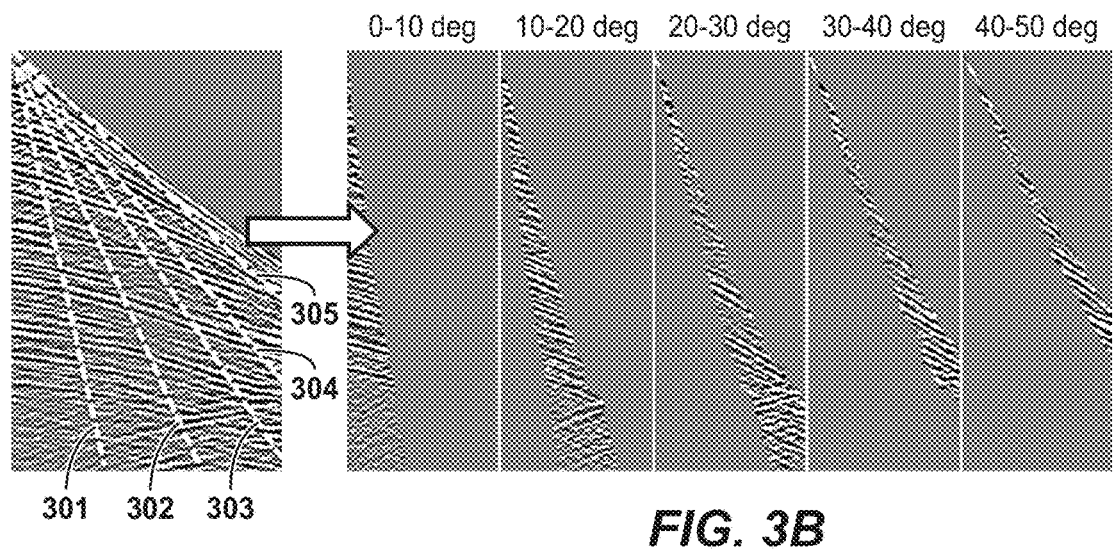
*FIG. 3A*  *FIG. 3B*
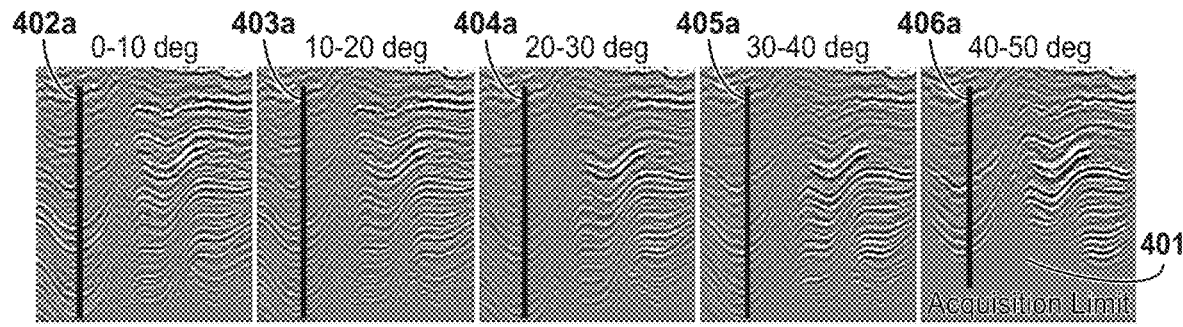
*FIG. 4A*
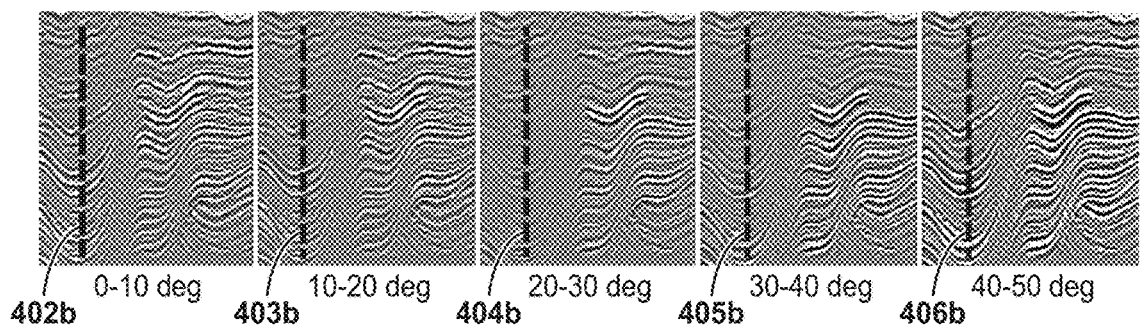
*FIG. 4B*

FWI MODEL DOMAIN ANGLE STACKS WITH AMPLITUDE PRESERVATION

CROSS-REFERENCE TO RELATED APPLICATION

This application claims the benefit of U.S. Provisional Patent Application 62/241,780 filed Oct. 15, 2015 entitled FWI MODEL DOMAIN ANGLE STACKS WITH AMPLITUDE PRESERVATION, the entirety of which is incorporated by reference herein.

FIELD OF THE INVENTION

Exemplary embodiments described herein pertain to the field of geophysical prospecting, and more particularly to geophysical data processing. Specifically, embodiments described herein relate to a method for more efficiently generating FWI model domain angle stacks.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy is generated at ground level by, for example, a controlled explosion, and delivered to the earth. Seismic waves are reflected from underground structures and are received by a number of sensors referred to as geophones. The seismic data received by the geophones is processed in an effort to create an accurate mapping of the underground environment. The processed data is then examined with a goal of identifying geological formations that may contain hydrocarbons.

Full Wavefield Inversion (FWI) is a geophysical method which is used to estimate subsurface properties (such as velocity or density). It is known to be advanced for the higher resolution and more accurate physics compared to conventional methods. The fundamental components of an FWI algorithm can be described as follows: using a starting subsurface physical properties model, synthetic seismic data are generated by solving a wave equation using a numerical scheme (e.g., finite-difference, finite-element etc.). The synthetic seismic data are compared with the field seismic data and using the difference between the two, the value of an objective function is calculated. To minimize the objective function, a modified subsurface model is generated which is used to simulate a new set of synthetic seismic data. This new set of synthetic seismic data is compared with the field data to recalculate the value of the objective function. The objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and to update the subsurface model. Commonly used local objective function optimization methods include, but are not limited to, gradient search, conjugate gradients, quasi-Newton, Gauss-Newton and Newton's method. Commonly used global methods included, but are not limited to, Monte Carlo or grid search.

Although FWI is expected to provide the subsurface properties, it is difficult to extract the correct viscoelastic properties from the seismic data directly with FWI. As FWI estimates the properties by fitting the data with synthetic waveforms, it relies on how accurate the wave equation can explain the actual physics, and how well the optimization method can separate the effects from different properties. When an acoustic wave equation is used, FWI can generate P-wave velocity models based on the travel time information in the datasets. However, the amplitude information is not fully utilized because the real earth is visco-elastic, and an acoustic model cannot explain all the amplitudes in the acquired data. If FWI is expected to provide interpretable products like elastic impedances, elastic simulation is often needed but very expensive; in general it is 6 to 10 times the computation of acoustic FWI. In addition, the initial model for shear wave velocity is difficult to obtain due to the limited shear wave kinematic information and often poor signal to noise ratio in the acquisitions.

An alternative way of using the elastic amplitude information is to form angle stacks. Amplitude versus angle (AVA) analysis [5] can be performed on the angle stacks to extract the elastic properties. Traditional AVA stacks generated with Kirchhoff migration need geometric spreading corrections to account for the amplitude loss during propagation. However, it is not guaranteed that the amplitude after correction would reflect the true amplitude of the data. In addition, Kirchhoff migration is based on ray-tracing which favors smooth velocity models and would likely fail in high contrast medium. Angle calculations are under a 1-D assumption that is not accurate enough when subsurface structures are complex. Reverse time migration (RTM) based angle stacks [1, 2] are more advanced for making use of the high-resolution velocity models. Nonetheless, amplitude preservation is still difficult. Yu Zhang et al (2014) [3] reported a least-squares RTM to balance the image amplitudes; however, it has not been proved to be able to generate angle stacks.

SUMMARY

A method, including: obtaining a seismic dataset that is separated into subsets according to predetermined subsurface reflection angle ranges; performing, with a computer, an acoustic full wavefield inversion process on each of the subsets, respectively, to invert for density and generate respective density models; generating acoustic impedances for each of the subsets, as a function of reflection angle, using the respective density models; and transforming, using a computer, the acoustic impedances for each of the subsets into reflectivity sections, wherein the transforming includes normalizing the reflectivity sections by their respective bandwidth.

In the method, each of the full wavefield inversion processes start from a same velocity model.

In the method, each of full wavefield inversion processes are independently applied to the subsets.

In the method, the obtaining includes dividing a shot gather into the subsets by using a data mask that includes information of reflector dipping angles and P-wave velocity.

The method can further include using, for each of the reflectivity sections, a Fourier transform, discrete Fourier transform, or a fast Fourier transform to calculate an average spectrum within at least one local window that is applied at a same location to all of the reflectivity sections, and determining a bandwidth for each average spectrum.

In the method, the determining the bandwidth is based on a distance between 10-dB points.

In the method, the determining the bandwidth is based on a distance between points with steepest slope.

In the method, the average spectrum is calculated within a plurality of local windows, and is averaged.

The method can further include determining reflectivity values at a plurality of angles and constructing an angle-vs-amplitude curve by interpolation.

The method can further include managing hydrocarbon production using the reflectivity sections.

In the method, the managing hydrocarbon production includes drilling a well at a location determined at least in part by the reflectivity sections.

A non-transitory computer readable storage medium encoded with instructions, which when executed by a computer cause the computer to implement a method including: obtaining a seismic dataset that is separated into subsets according to predetermined subsurface reflection angle ranges; performing, with a computer, an acoustic full wavefield inversion process on each of the subsets, respectively, to invert for density and generate respective density models; generating acoustic impedances for each of the subsets, as a function of reflection angle, using the respective density models; and transforming, using a computer, the acoustic impedances for each of the subsets into reflectivity sections, wherein the transforming includes normalizing the reflectivity sections by their respective bandwidth.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 3A illustrates a single shot gather.

FIG. 3B illustrates the single shot gather that is muted into five different angle ranges.

FIG. 4A illustrates angle stacks with acoustic FWI.

FIG. 4B illustrates angle stacks with convolutions.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Exemplary embodiments described herein provide a method than can: 1) be robust with complex geology; 2) preserve the amplitude versus angle information; and 3) be less expensive than elastic FWI. The proposed FWI model domain angle stacks can be generated by inverting the datasets of different angle ranges for different acoustic models. Amplitude preservation can be achieved through the data fitting process, and the angle calculation is more accurate using Poynting vectors. The Poynting vector describes energy flow for body waves, interface waves, guided waves and inhomogeneous waves in isotropic and anisotropic media. Poynting vectors naturally take the advantage of the high-resolution FWI velocity models. When implemented as an integrated part of a FWI workflow, the present technological advantage can utilize the FWI products angle stacks without changing platforms. More importantly, exemplary method are not limited to the incomplete physics in the modeling engine.

Exemplary embodiments of the present technological advancement generates model domain amplitude preserved angle stacks using FWI. Advantageously, the present technological advancement can use only acoustic simulations, but can be applied to the full offsets of the acquired seismic data. It is impossible to use one acoustic model to fit all the data that contains all kinds of physics. However, if the datasets are separated by the reflection angles, for each angle, there is an acoustic model that can explain the data. With all the models combined, an impedance model is formed as a function of reflection angle: $I(\theta)$. Acoustic impedance is a measure of the ease with which seismic energy travels through a particular portion of the subsurface environment. Those of ordinary skill in the art will appreciate that acoustic impedance may be defined as a product of density and seismic velocity. From the impedance, the reflectivity can be derived as a function of angle: $R(\theta)$, which is exactly the definition of AVA.

In practice, it is not necessary to find a continuous form of $R(\theta)$. Instead, $R(\theta)$ can be determined at several angles, and the AVA curve can be reconstructed by interpolation.

Figure 1:
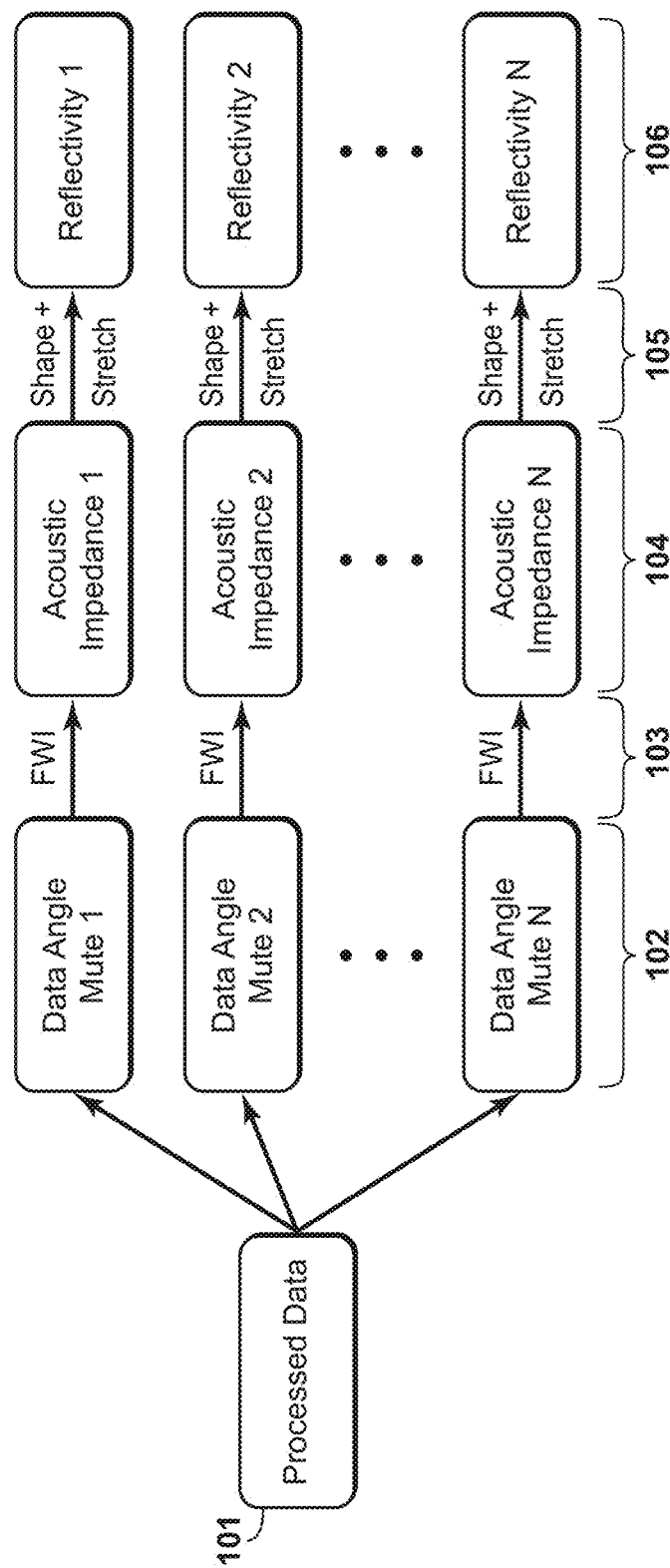
FIG. 1 illustrates an exemplary method for generating FWI AVA stacks.

FIG. 1 illustrates an exemplary method for generating FWI AVA stacks. In step 101, processed data is obtained, which can be a single shot gather generated from the collected seismic data. Such processed data is seismic data conditioned according to conventional techniques known to those of ordinary skill in the art. In step 102, the shot gather is divided into several subsets. Each subset is within a relatively small range of reflection angles. This can be achieved by using carefully designed data masks which include the information of reflector dipping angles and P-wave velocity. With the dipping angles and P-wave velocity, a ray-tracing method can be used to find the time and offset of the reflected wave in the data from each of the subsurface points at each reflection angle. Data masking is a process of hiding a portion of the original data so that only the desired portion (i.e., desired angle range) is available for subsequent processing. The angle ranges shown in the accompanying figures are only exemplary, and other angle ranges can be used. Moreover, the number of angle ranges is also exemplary as the shot gather could be divided in to more or less sections.

In step 103, on each of the data subsets generated in step 102, acoustic FWI is applied to obtain acoustic impedances independently. Those of ordinary skill in the art are familiar with acoustic FWI and further details of this process are omitted. All inversions can start from the same velocity model, and the kinematics are not updated in this process assuming that velocity model building is already finished and accurate enough. The model updates are meant to explain the data amplitude only. After the inversion, the synthetic waveforms simulated with these impedances fit the real data well so that the amplitude information is preserved in the model domain. Each impedance model can only explain the data of a certain range of reflection angles constrained by the data masks. Within one angle range, the mid angle can be chosen to be the nominal angle of the reflectivity. This is additionally guaranteed by using Poynting vectors [2] when forming the gradient in the inversion, and so the gradient is most sensitive to the reflections at the nominal angle. Poynting vectors are used to separate the wave propagation directions during the finite difference simulation and gradient calculation. The data separation can be conducted based on ray-theory. Since the Poynting vector is based on wave-theory, it can be a helpful check on the accuracy of the data separation.

The term velocity model, density model, or physical property model as used herein refers to an array of numbers, typically a 3-D array, where each number, which may be called a model parameter, is a value of velocity, density or another physical property in a cell, where a subsurface region has been conceptually divided into discrete cells for computational purposes.

After the inversion, both density and velocity are known and step 104 can determine impedance from the results of the acoustic FWI as impedance is a function of density and velocity.

In acoustic FWI, two parameters can be inverted for to fit the data amplitudes: P-wave velocity and density. P-wave velocity is often chosen to fit the amplitude and travel time at the same time when an L-2 norm type of objective function is used. However, density may be a better parameter for reflectivity inversion. Density has a much simpler AVA response than P-wave velocity. As described in the Aki-Richards equation:

$$R(\theta) = \frac{1}{2}\frac{\Delta \rho}{\rho} + \frac{1}{2\cos^2\theta}\frac{\Delta \alpha}{\alpha} \quad [1]$$

where Δp is density perturbation and Δα is the P-wave velocity perturbation, density has a constant AVA response which does not vary with angle [6]. This indicates that when a density perturbation is inverted for to fit the data amplitude at a certain angle θ, the value of the perturbation directly represents the reflectivity at that angle θ regardless of the actual value of θ. On the contrary, if a P-wave velocity perturbation is used, in order to obtain R(θ), we need to apply a correction of $$\frac{1}{2\cos^2\theta}.$$

Moreover, Equation [1] is only valid when the perturbation is weak, and when the perturbation is strong, the correction does not have an explicit form. For density, the constant AVA response is valid for all cases.

After the acoustic impedances are obtained, they can be shaped or converted into reflectivity sections (P-P reflectivity) in step 105. The reflectivity sections can be approximately determined from the derivative of the acoustic impedance with respect to space (or more generally the vertical derivative, which in some cases could be time). However, there is one more step to balance the reflectivity spectrum across different angles, i.e., "stretch". While FIG. 1 shows "shape" and "stretch" in the same step, these are not necessarily performed simultaneously.

Figure 2:
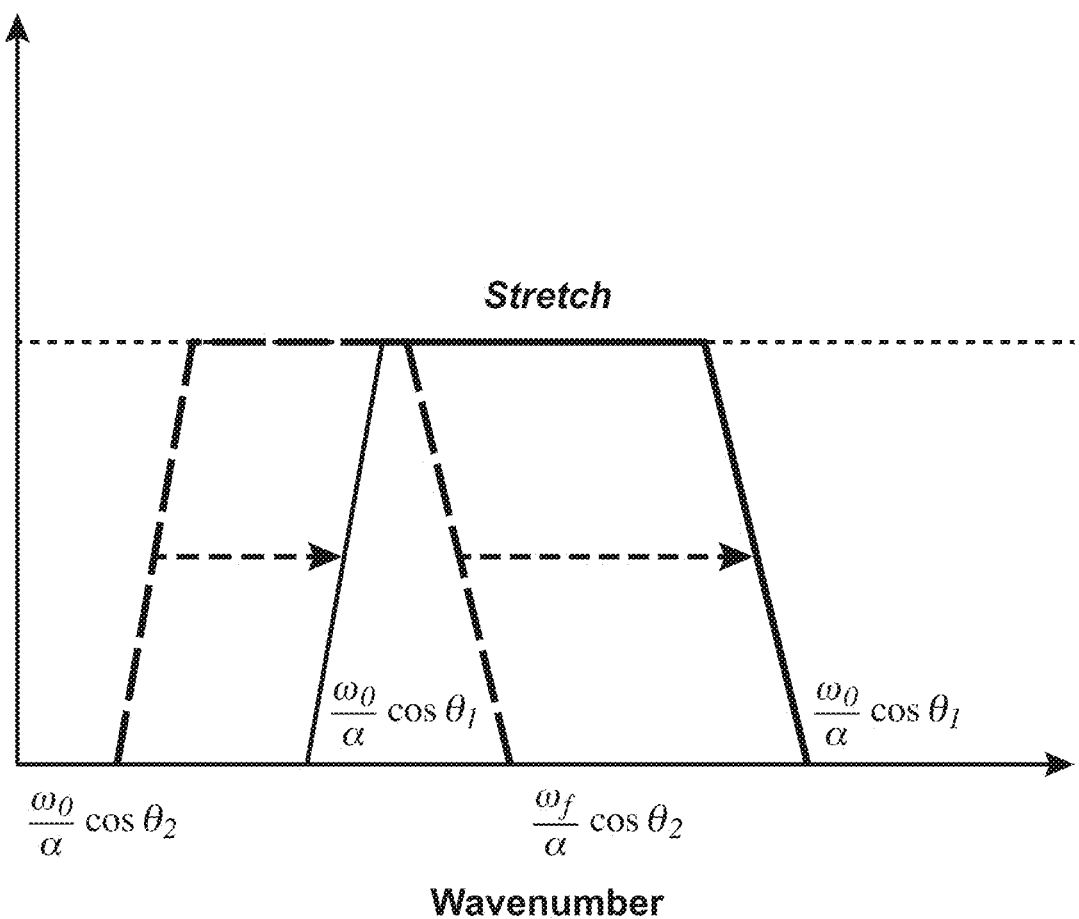
FIG. 2 illustrates the spectrum spreading effect due to scattering angles.

Similar to the wavelet stretching effect in migration, the reflectivity's obtained from data of different reflection angles are of different resolutions. Because there is only bandlimited data ($\omega_0 \sim \omega_f$), where $\omega_0$ and $\omega_f$ are the minimum and maximum frequencies present in the data, at each angle θ the reflectivity spectrum is only sampled from $$\frac{\omega_0}{\alpha}\cos\theta \text{ to } \frac{\omega_f}{\alpha}\cos\theta$$

in the wavenumber domain as shown in FIG. 2. Different bandwidth in the wavenumber domain leads to different amplitude in the space domain. Assuming the true reflectivity values $R(\theta_1)$ and $R(\theta_2)$ are the same, the relation between the inverted reflectivities would be $$\frac{R(\theta_1)}{R(\theta_2)} = \frac{\cos\theta_1}{\cos\theta_2}.$$

Therefore, to preserve the data AVO in the model domain, there is a need to compensate the spectrum stretch by dividing by a factor of cos θ. In practice, it is difficult to use data of a single reflection angle. Therefore, an alternative way of obtaining the compensation factor is to measure the bandwidth of the reflectivity. For all the reflectivity sections, a Fourier transform can be used to calculate the averaged spectrum within a local window that is applied at the same location to all sections. This can be performed at multiple locations and averaged, as long as the locations are the same in all sections. The Fourier transform may be preferred, but other transforms could be used, such as FFT or DFT. The bandwidth can be defined, for example, as the distance between the 10-dB points. However, other measures of bandwidth can be used (i.e., 3-dB points, full-width half maximum, points of steepest slope, etc.), but the distance between the 10-dB points may be preferred. Then, to complete step 105 and compensate for the "stretch," each reflectivity section is normalized by its own bandwidth so that the spectrum stretching effect on the reflectivity amplitude is corrected for.

The final output of the method in FIG. 1 (step 106) are the reflectivity stacks for different angles.

Figure 5:
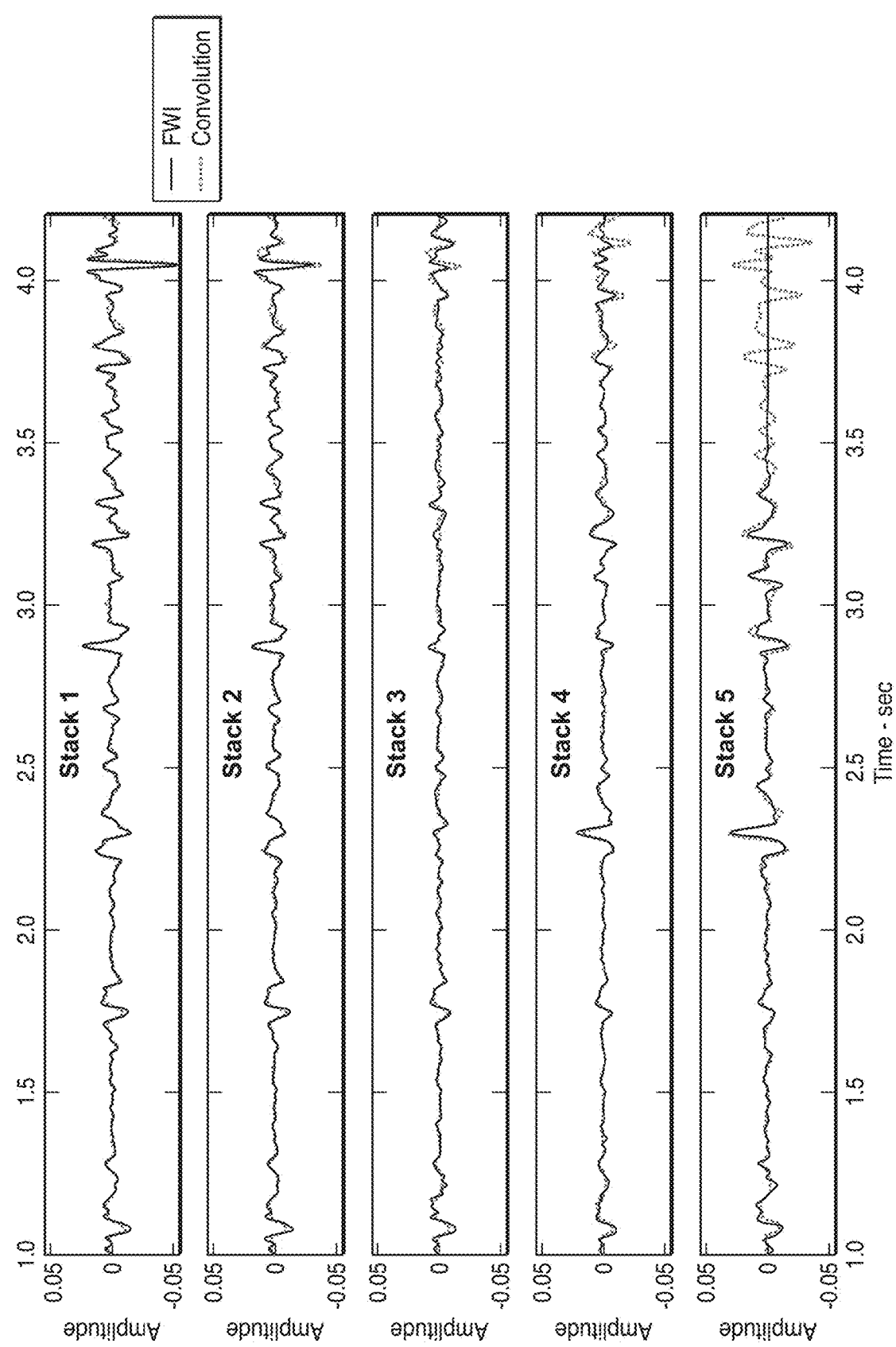
FIG. 5 illustrates the vertical lines from each angle stack in FIGS. 4A and 4B, overlaid to show consistency.

The present technological advancement was applied on a synthetic dataset generated with a 2-D slice extracted from the SEG SEAM Phase I model. Pressure data are simulated with streamers of 4 km maximum offset. An absorbing boundary condition is used on the water surface. Therefore, no free surface related multiples are present in the data. As shown in FIG. 3A, a single shot gather is divided into five sections by the dashed lines 301, 302, 303, 304, and 305, which corresponds to the following angle ranges: 0-10; 10-20; 20-30; 30-40; and 40-50 degrees. The angle ranges do not necessarily need to overlap. Five data masks are designed based on these lines 301-305, each covering 10 degrees of reflection angle. Therefore, five data subsets are generated (see step 102) as shown in FIG. 3B. Starting from the same velocity model, acoustic FWI was performed (see step 103) using each of the subsets respectively. The resulting acoustic impedances (see step 104) after the inversion are "shaped" and "stretched" (see step 105) into reflectivity sections (see step 106), and shown in the panels in FIG. 4A. The gap area 401 in the last panel is because the large angle reflection from the deep part is outside of the acquisition offset. To verify the quality of the results, true reflectivity sections are generated by the convolution between the seismic wavelet and the reflectivity sequences, and are shown in FIG. 4B. The reflectivity sequences are calculated using the Zoeppritz equation [4] and the true synthetic model. The AVA in FIGS. 4A and 4B appears to be consistent. For a closer scrutiny, five vertical lines 402a, 403a, 404a, 405a, and 406a from the model domain stacks, and five from the convolution sections 402b, 403b, 404b, 405b, and 406b are overlaid in FIG. 5 to show the consistency. It is clear that at all angles and all depths the FWI model domain stacks have very similar amplitudes compared to the convolution stacks. It demonstrates that the workflow is reliable and accurate with a complicated geology.

The final reflectivity's are an example of a subsurface image that can be used for interpretation of the subsurface and/or management of hydrocarbon exploration. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

In all practical applications, the present technological advancement must be used in conjunction with a computer, programmed in accordance with the disclosures herein. Preferably, in order to efficiently perform FWI, the computer is a high performance computer (HPC), known as to those skilled in the art, Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

REFERENCES

The following references are hereby incorporated by reference in their entirety:

[1] Xu, S., Y. Zhang and B. Tang, 2011, 3D angle gathers from reverse time migration: Geophysics, 76:2, S77-S92. doi:10.1190/1.3536527;

[2] Thomas A. Dickens and Graham A. Winbow (2011) RTM angle gathers using Poynting vectors. SEG Technical Program Expanded Abstracts 2011: pp. 3109-3113;

[3] Yu Zhang, Lian Duan, and Yi Xie (2013) A stable and practical implementation of least-squares reverse time migration. SEG Technical Program Expanded Abstracts 2013: pp. 3716-3720;

[4] Encyclopedic Dictionary of Applied Geophysics, R. E. Sheriff, 4$^{th}$ edition., SEG, 2002, p. 400;

[5] Encyclopedic Dictionary of Applied Geophysics, R. E. Sheriff, 4th edition., SEG, 2002, p. 12; and

[6] Aki, K and Richards, P (1980) Quantitative seismology, 2nd edition, University Science Books, p. 133-155.

What is claimed is:

1. A method, comprising:
    obtaining a seismic dataset that is separated into subsets according to predetermined subsurface reflection angle ranges;
    performing, with a computer, an acoustic full wavefield inversion process on each of the subsets, respectively, to invert for density and generate respective density models;
    generating acoustic impedances for each of the subsets, as a function of reflection angle, using the respective density models;
    transforming, using a computer, the acoustic impedances for each of the subsets into reflectivity sections, wherein the transforming includes normalizing the reflectivity sections by their respective bandwidth; and
    using, for each of the reflectivity sections, a Fourier transform, discrete Fourier transform, or a fast Fourier transform to calculate an average spectrum within at least one local window that is applied at a same location to all of the reflectivity sections, and determining a bandwidth for each average spectrum.

2. The method of claim 1, wherein each of the full wavefield inversion processes start from a same velocity model.

3. The method of claim 1, wherein each of full wavefield inversion processes are independently applied to the subsets.

4. The method of claim 1, wherein the obtaining includes dividing a shot gather into the subsets by using a data mask that includes information of reflector dipping angles and P-wave velocity.

5. The method of claim 1, wherein the determining the bandwidth is based on a distance between 10-dB points.

6. The method of claim 1, wherein the determining the bandwidth is based on a distance between points with steepest slope.

7. The method of claim 1, wherein the average spectrum is calculated within a plurality of local windows, and is averaged.

8. The method of claim 1, further comprising determining reflectivity values at a plurality of angles and constructing an angle-vs-amplitude curve by interpolation.

9. The method of claim 1, further comprising managing hydrocarbon production using the reflectivity sections.

10. The method of claim 1, wherein the managing hydrocarbon production includes drilling a well at a location determined at least in part by the reflectivity sections.

11. A non-transitory computer readable storage medium encoded with instructions, which when executed by a computer cause the computer to implement a method comprising:
    obtaining a seismic dataset that is separated into subsets according to predetermined subsurface reflection angle ranges;
    performing, with a computer, an acoustic full wavefield inversion process on each of the subsets, respectively, to invert for density and generate respective density models;
    generating acoustic impedances for each of the subsets, as a function of reflection angle, using the respective density models;
    transforming, using a computer, the acoustic impedances for each of the subsets into reflectivity sections, wherein the transforming includes normalizing the reflectivity sections by their respective bandwidth; and using, for each of the reflectivity sections, a Fourier transform, discrete Fourier transform, or a fast Fourier transform to calculate an average spectrum within at least one local window that is applied at a same location to all of the reflectivity sections, and determining a bandwidth for each average spectrum.

* * * * *